No. 733,877. PATENTED JULY 14, 1903.
E. SCHUMACHER.
PULLEY.
APPLICATION FILED OCT. 29, 1902.
NO MODEL.
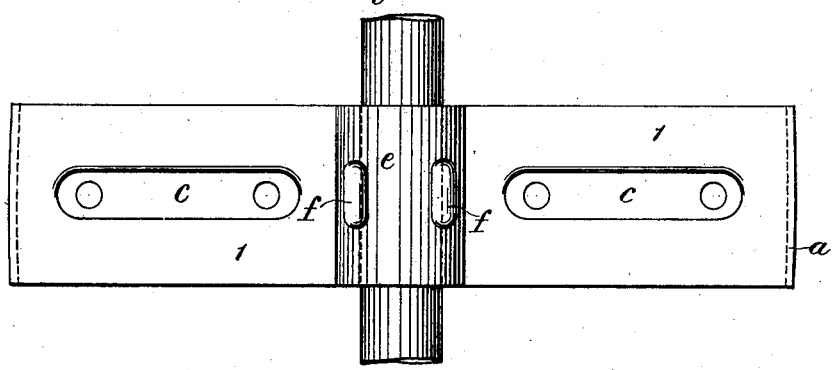
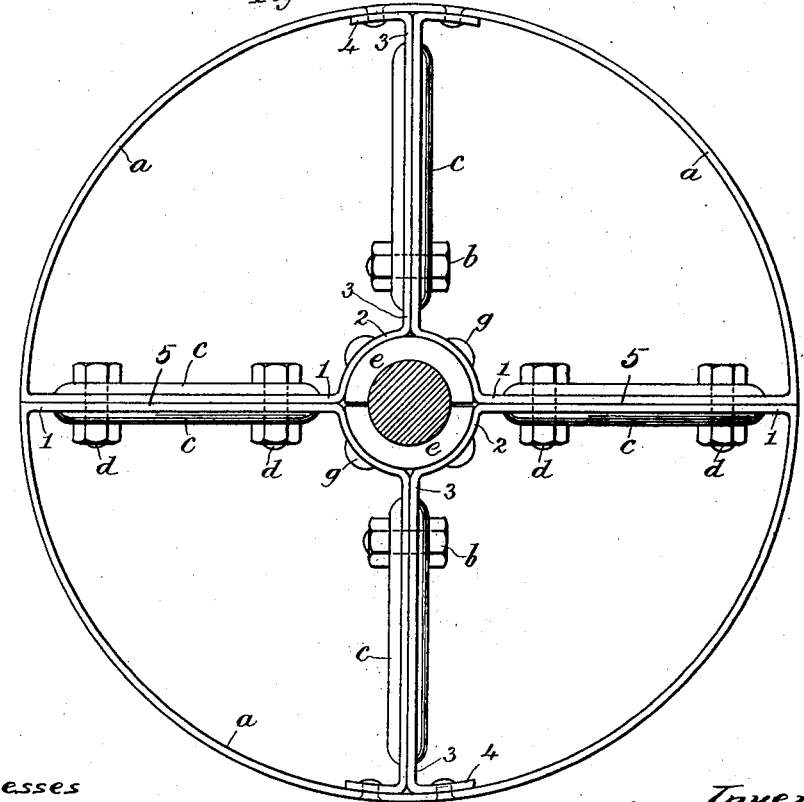
Witnesses
A. B. Williams
L. G. Handy
Inventor
Eberhard Schumacher
By Mason Fenwick & Lawrence
his Attorneys.

No. 733,877.

Patented July 14, 1903.

UNITED STATES PATENT OFFICE.

EBERHARD SCHUMACHER, OF DARLINGTON, ENGLAND, ASSIGNOR TO J. F. PEASE AND COMPANY, LIMITED, OF DARLINGTON, ENGLAND.

PULLEY.

SPECIFICATION forming part of Letters Patent No. 733,877, dated July 14, 1903.

Application filed October 29, 1902. Serial No. 129,295. (No model.)

*To all whom it may concern:*

Be it known that I, EBERHARD SCHUMACHER, a subject of the King of Great Britain, and a resident of 124 Westmoreland street, Darlington, in the county of Durham, England, have invented certain new and useful Improvements in Pulleys, of which the following is a specification.

This invention relates to improvements in pulleys, and especially to that class of pulleys which are made up of sections; and it consists in a pulley formed of sections, the said sections being made of metal bent to form a rim portion and also to form spokes and a corresponding hub portion, the said sections being applied together to form a complete pulley.

It also consists in certain other novel constructions, combinations, and arrangements of parts, as will be hereinafter fully described and claimed.

In the accompanying drawings, Figure 1 is a side elevation of a pulley formed in accordance with this invention. Fig. 2 is a plan view of one-half the pulley looking at the same from the spoke side.

The object of this invention is to provide pulleys which may be split or otherwise, but which can be made in a very simple manner from strips of metal, the said metal forming the rim, spokes, and hub of such pulley.

While the pulley may be made of various numbers of sections for the sake of illustration, I have shown in the drawings a pulley formed of two sections, each section forming a half of the pulley. In forming these sections I preferably use a strip of steel or other flat material, as 1, bending the same to form a semicircular rim portion $a$. The ends of the metal are then turned inwardly at a sharp angle extending straight toward the axis of the pulley, the inturned portion forming a portion of a spoke 5. The metal is next bent in a segmental form, with the axis of the pulley as a center, so as to make the part of a hub for a pulley, the two inwardly-extending ends of the metal strip being then bent at an angle and running parallel against each other outwardly from the axis of the pulley to the rim again, forming a spoke 3. The outer ends of the strip are then turned outwardly, as shown at 4 in Fig. 1, which outwardly-turned ends are riveted or bolted to the rim portion $a$ of the pulley-section. The whole section thus described will be seen to be formed of one piece of metal, the said metal constituting the rim, the spokes, and the hub of the pulley. The outwardly-extending portions of the metal strip which form the spoke 3 are secured and further braced with respect to each other by a bolt $b$. By this means the two portions of the spoke are thoroughly fastened together and the bent shape of the strip of metal is maintained. By applying a second section like that just described to the first section, as shown in Fig. 1, and securing the same together by bolts or rivets, as $d$, which pass through the spokes 5, the pulley is complete, with the exception of the hub, which is further provided with metal bushings $e$, which fit within the hub-sections of the pulley 2. The bushing $e$ is preferably made in sections, so that the pulley as a whole may be applied to a shaft as a split pulley, being secured together around the shaft afterward by the insertion and tightening of the bolts $d$, or the pulley may be made up complete before its application to a shaft and can have its hub slid upon the end of said shaft, as is common with all pulleys not of the split type. The spoke portions of the pulley-sections are preferably stiffened and strengthened by forming ribs or elongated corrugations $c$, as clearly shown in the drawings. Where such corrugations are employed, the bolts $b$ and $d$ may be passed through the ribbed or corrugated portions thereof after securing the parts together. The bushing-sections $e$ are also positively held in position in the hub 2 of the pulley by being provided with external bosses or projections $f$, which fit into grooves or recesses $g$, formed in the hub 2 of the pulley. The corrugations $c$ and the grooves $g$ are preferably formed in the metal by stamping the same with suitable machinery. It is also obvious that the pulley might be formed with a greater number of sections than two, the sections being made of metal bent in the same manner as above described, so that each section forms a portion of the pulley-rim, a part of two spokes, and an entire third spoke. Of course when the pulley is made of a greater number of sections than those shown in the drawings the number of spokes will be correspondingly increased, and the number of sections of which the pulley is formed may be regulated by the size and strength of the pulley desired.

I of course contemplate employing any number of corrugations or stiffening-ribs upon the spoke portions of the pulley-section as may be desired, all within the spirit of the present invention. It will also be evident that I may make any number of bosses and grooves in the bushing or hub of the pulley as may be found desirable.

A pulley constructed in the above-described manner is simple and yet may be made of any desired strength, and when its parts are completed and secured together a strong and durable structure is produced.

Having thus fully described my invention, what I claim as new, and desire to secure by Letters Patent, is—

1. A pulley comprising a plurality of sections formed of metal, portions being bent inwardly to form parts of some spokes of the pulley and outwardly again to form a completed spoke within said sections, substantially as described.

2. A pulley comprising sections each of which is formed of a flat metal strip bent in a curved manner to form a portion of the rim, the ends of the said strip then being turned inwardly toward the axis of the pulley to form parts of some of the spokes and then extending outwardly again to the rim to form other completed spokes, substantially as described.

3. A pulley comprising sections formed of a strip of metal bent to the arc of a circle for forming a portion of the pulley-rim, the ends of the said strip being then turned inwardly approximately at right angles to the rim and extending straight for a distance toward the axis of the pulley, each end of the piece being then bent in a segmental shape to form a portion of the pulley-hub, outwardly-bent portions applied together and extending from the hub to the rim, and means for securing the outer ends of the same to the rim whereby a completed intermediate spoke is formed in the pulley-section, substantially as described.

4. A pulley formed of a plurality of sections applied together, each section being formed of a strip of metal curved to form a portion of the pulley-rim and bent inwardly to form halves of the spokes, segmental bends being formed at the center for a hub, outwardly-bent portions forming additional completed spokes together with means for securing the pulley-sections together and the spoke-sections together, substantially as described.

5. A pulley formed of pulley-sections made of strip metal bent to form a rim portion and extending inwardly to form spoke-sections, and outwardly to form an intermediate completed spoke, the component parts of the spokes being provided with grooves or corrugations to stiffen them, substantially as described.

6. A pulley comprising sections formed of metallic pieces bent to form a rim portion and turned inwardly to form spoke portions, outwardly-turned portions also formed upon said pieces to constitute additional spokes, segmental bends being formed in the strips at the center to make a hub, the said hub portions being formed with recesses, and a bushing for the pulley formed of divisible sections having bosses or projections on their outer surfaces for engaging the recesses in the hub portions of the pulley, substantially as described.

In testimony whereof I have signed my name to this specification in the presence of two subscribing witnesses.

E. SCHUMACHER.

Witnesses:
HORACE WENTGARTHE WOOLER,
FREDERICK GEO. NESBITT.